United States Patent [19]
Ray et al.

[11] 3,787,730
[45] Jan. 22, 1974

[54] BILATERAL HIGH VOLTAGE DC SYSTEM

[75] Inventors: Thomas J. Ray, Yonkers, N.Y.;
Glenn C. Waehner, Riverside, Conn.

[73] Assignee: United Aircraft Corporation, East Hartford, Conn.

[22] Filed: Dec. 29, 1971

[21] Appl. No.: 213,666

[52] U.S. Cl. ............... 307/77, 307/82, 313/92 PF, 321/27 R, 323/25, 323/DIG. 1
[51] Int. Cl. ........................................... H02m 3/22
[58] Field of Search.... 330/13; 307/5, 6, 58, 63, 77, 307/82; 313/92 PF; 315/27 TD, 31 TV; 321/2, 27 R; 323/25

[56] References Cited
UNITED STATES PATENTS

| | | | |
|---|---|---|---|
| 3,619,758 | 11/1971 | Deranian | 321/27 R |
| 3,659,190 | 4/1972 | Galluppi | 313/92 PF |
| 3,723,855 | 3/1973 | Shuleshko | 315/27 TD |
| 3,500,218 | 3/1970 | Burwen | 330/13 X |
| 3,569,847 | 3/1971 | Adams | 330/13 |
| 3,636,380 | 1/1972 | Anderson | 330/13 X |

*Primary Examiner*—A. D. Pellinen
*Attorney, Agent, or Firm*—Melvin Pearson Williams

[57] ABSTRACT

A load is connected across one DC source of a first polarity and is connected to the opposite polarity of a second DC source, the two sources being connected in series with a capacitor/resistor network, or other voltage maintaining circuit, connected in parallel with the series combination of the two sources. The first source drives the load in one polarity and the second source drives the load in the other polarity thereby to achieve rapid slewing of the voltage across the load. In another embodiment a fixed power source may be connected in series with the first power source so that the slewing of voltage across the load occurs above a given reference level. The first and second sources are driven in a complementary fashion so that the sum of their instantaneous output voltages is always constant and equal to the individual maximum voltage which each may obtain. Since the slewed sources comprise a high voltage bilateral system, feedback may be utilized for stability and accuracy.

6 Claims, 6 Drawing Figures

BILATERAL HIGH VOLTAGE DC SYSTEM

BACKGROUND OF THE INVENTION

1. Field of Invention

This invention relates to high vltage DC power sources, and more particularly to a bilateral high voltage DC system.

2. Description of the Prior Art

Since DC voltages are naturally unilateral in nature, the equipment which supplies DC voltages to loads is similarly unilateral in nature. This poses relatively few problems at low voltage levels, but it has heretofore been extremely difficult to achieve bilateral operation at high voltage levels. Similarly, the utilization of feedback on high voltage DC power supplies has been less than successful since the feedback operates rapidly in increasing the output voltage, but cannot operate rapidly in decreasing the output voltage due to the lack of a discharge path for the load through the rectifiers of the power supply.

As an example, consider the power requirements of a multiple phosphor layer, variable penetration type cathode ray tube. The screen of a variable color penetration type tube includes different colored phosphors, one phosphor being in a layer closer to the electron gun and the other phosphor being in a layer more remote from the electron gun, with an energy potential barrier between the layers. When the electron beam is operated at a low energy level (with a low anode voltage), the beam only penetrates the first layer and therefore activates only the phosphor close to the electron gun, thereby providing a display of a related color. When the beam is operated at a higher energy level (higher anode voltage) the beam penetrates the barrier and activates the more remote phosphor so that the screen displays a pattern having the color resulting from excitation of both phosphors.

Employing a variable penetration type tube in a data display system is subject to certain problems. In order to maintain a vivid display of good resolution, the data must be refreshed at a rapid rate (which may, for instance, be on the order of once every 16 milliseconds). All of the symbols, in the various colors employed in the display, must therefore be refreshed within this time period, so that a rapid slewing of the voltage from the lower energy level to the higher energy level, and from the higher energy level to the lower energy level must be achieved. For example, the color transitions, and therefore the slewing of the anode voltage may typically be required to be accomplished in less than half a millisecond, so as to not degrade the appearance of the display by wasting display-generating time.

The anode of a cathode ray tube represents a significant capacitance since it comprises an extremely large surface area of a conductive layer or film disposed about the tube, all the way from the screen to the vicinity of the electron gun. To charge and discharge this capacitive load in such short periods of time requires appreciable charging and discharging current. By analyzing in detail the requirements for this type of power supply, it can be shown that a high quality, high voltage transformer-rectifier combination has the capability of producing the positive steps of voltage required on the output; that is, it can supply the required current so as to drive the capacitive loads sufficiently rapidly to achieve a suitably rapid increase in the voltage at the anode of the CRT: the low voltage input of the power oscillator driving such a transformer-rectifier supply need only be programmed upwardly, and with a suitably low net impedance in the circuit, can result in a very short charge time. On the other hand, when the step is from a high voltage to a low voltage, the discharging of the high capacitive load proves to be very difficult to mechanize. When the input voltage to the power oscillator or other AC source is reduced, the transformer voltage drops, but the voltage to the load does not follow because the rectifiers of the power supply are unable to pass the current in the reverse direction. The capacitance of the load stores sufficient energy to prevent a rapid downward transient in the voltage. In power supplies for variable penetration tubes known to the art, the rapid discharge of the capacitive load is achieved by switching in a high voltage shunt element for a short period of time to allow the current through the element to discharge the capacitive load. This approach requires the use of a high voltage vacuum tube since active semiconductor devices able to withstand high voltage (in the neighborhood of 15 kilovolts) are not normally available. Otherwise use of shunt resistance results in a significant power wastage and a heating problem as a result of the dissipation of power in the resistance.

The foregoing is an example of a need for a high voltage system. In many instances, attempts are made to utilize feedback so as to regulate high voltage supplies very carefully. However, since a high voltage supply is typically not bilateral in its response characteristic due to the rectifiers therein, the feedback cannot correct the output of a power supply in an inverse direction as fast as it can in a forward direction. In other words, the nonlinearity of high voltage power supply in one direction renders these unsuitable as high voltage systems.

SUMMARY OF INVENTION

The primary object of the present invention is to provide a substantially linear, bilateral high voltage system. Another object of the present invention is to provide a high voltage power source in which the output voltage can be rapidly slewed in both increasing and decreasing directions. Still another object of the present invention is to provide a high voltage power source capable of rapidly slewing between different anode voltages required for different phosphor response in a variable penetration type cathode ray tube device.

In accordance with the present invention, a pair of high voltage sources, each capable of providing a like range of voltages are connected in series, with one common output terminal, and a relatively constant high voltage reference is connected across the series pair; the output of the system is taken from said common output terminal; and sources are operated in a differential fashion so that the total voltage is always constant and equal to the maximum wich either can obtain, but the output voltage varies in dependence on the voltage of each. In accordance with the present invention, one power supply drives a load when the voltage is to be changed in one direction of polarity, and an oppositely poled power supply drives the load when the voltage is to be changed in a direction of the opposite polarity.

In further accord with the present invention, an additional source may be utilized to provide a fixed bias so that the output is slewed from some finite voltage to a higher voltage, the finite voltage being equal to the bias supplied by the additional source.

In further accord with the present invention, a bilateral high voltage DC system is provided, which permits utilization of bilaterally effective feedback.

Other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
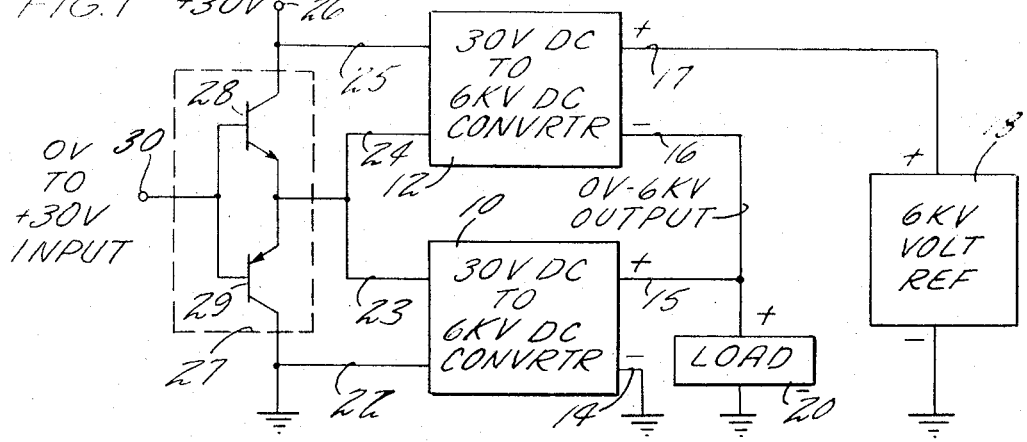
FIG. 1 is a schematic block diagram of a first embodiment of the present invention.

Referring now to FIG. 1 a pair of high voltage sources, which may preferably comprise DC/DC converters and are illustrated herein as being converters capable of converting a 0 to 30 volt DC input into a 0 to 6 KV DC output, are connected with their outputs 14, 15 and 16, 17 in series, with a high voltage reference 18 connected across the series combination of the outputs 14–17. A load 20 is connected across the outputs 14, 15 of the converter 10. The input terminals 22, 23 and 24, 25 of the converters 10, 12 are similarly connected in series across a plus 30 volt input source 26 and an input circuit 27 including an NPN transistor 28, across the terminals 24, 25 and a PNP transistor 29 across the terminals 22, 23. The transistors are driven by an input signal applied to an input terminal 30, which in this embodiment may range between 0 and 30 volts DC. When the input terminal is at zero volts, the PNP transistor 29 is in full conduction thereby short circuiting the terminals 22, 23 of the converter 10 so that there is no input to the converter 10 and there will be no output across its output terminals 14, 15. In this condition, the load 20 receives no voltage. At the same time, 0 volts applied to the NPN transistor 28 cause it to cut off so that the full thirty volts of the source 26 is applied across the input terminals 24, 25 of the converter 12 so that it has a full 6 KV output across its output terminals 16, 17. With the output across the load 20 being zero, the output terminal 17 is at 6 KV above ground, so that it applies the 6 KV to the voltage reference 18.

Figure 2:
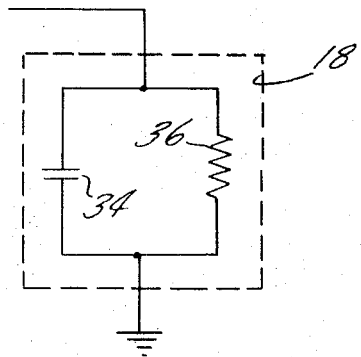
FIG. 2 is a partial schematic diagram of a voltage reference which may be utilized in the embodiment of FIG. 1.
Figure 3:
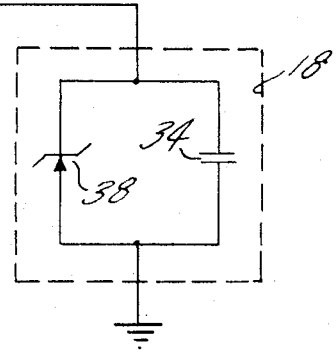
FIG. 3 is a partial schematic diagram of an alternative voltage reference which may be utilized in the embodiment of FIG. 1.

The voltage reference 18 may be of either of the forms shown in FIGS. 2 or 3, or other known equivalents thereto. In FIG. 2, a capacitor 34 is connected in parallel with a resistor 36. The capacitor becomes charged to the basic working potential of the voltage reference, which in this embodiment is 6 KV. The capacitor 34 preferably has a capacitance which is large in comparison with the capacitance of the load 20, and the resistance 36 can be a relatively high resistance since its only function is to bleed off small increases in potential across a capacitor 34 which occur during switching.

In FIG. 3, the voltage reference 18 may alternatively comprise a zener diode 38 (which must be capable of with-standing the basic potential of the voltage reference 18) in place of the resistor 36. Because the zener diode tends to maintain a more nearly constant potential, the capacitor 34 need not be large with respect to the load in the embodiment of FIG. 3. In other forms, the capacitor 34 may be shunted with a switch (either alone or in series with a resistor) arranged to turn on only during transients requiring a discharging of the capacitor.

Consider now changing the input voltage from zero volts to plus thirty volts. This will cause the NPN transistor 28 to become highly conductive, and will cause the PNP transistor 29 to shut off. In this condition, input terminals 24, 25 of the converter 12 are short circuited so there is no input to the converter 12 and it will have 0 volts at its output terminals 16, 17. On the other hand, the full 30 volts will be applied from the source 26 through the transistor 28 across the terminals 22, 23 of the converter 10 so that it will have a full 6 KV output across its output terminals 14, 15 and apply the full 6 KV across the load 20. Since the terminal 15 is at 6 KV above ground, and there is no voltage between the terminals 16, 17, there is still 6 KV applied to the voltage reference 18. Thus it can be seen that the total voltage between the terminal 17 and ground remains the same although the voltage across the load varies in a differential fashion with the voltage across the converter 12. Thus in a purely on/off situation as described thus far, when one converter has an output the other one has not, and vice versa, such that the total voltage remains the same, but the application of this voltage to the load 20 can vary in accordance with the input.

Figure 4:
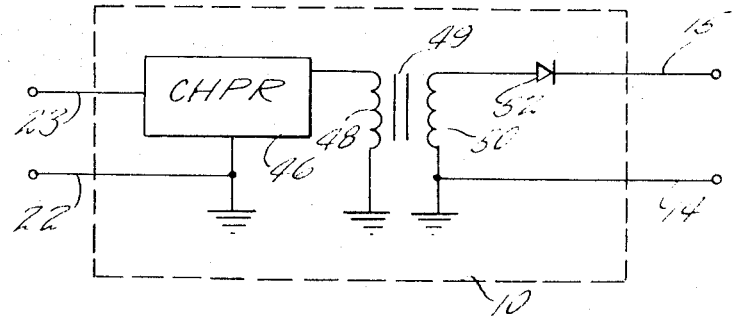
FIG. 4 is a simplified schematic illustration of a DC to kilovolt DC converter which may be utilized in the embodiment of FIG.1.

An important aspect of the present invention in overcoming an inherent limitation in high voltage DC apparatus is illustrated in FIG. 4. FIG. 4 briefly illustrated what each of the converters 10, 12 may comprise. In FIG. 4, the input terminals 22, 23 apply a DC input voltage to a chopper 46, the output of which drives the primary 48 of a transformer 49, the secondary 50 of which is applied through a rectifier 52 to the output terminal 15. When there is initially no input to the chopper (therefore no output across the terminals 14, 15) and thereafter the input to the chopper increases by some significant amount (even the full thirty volts in the present embodiment) it is a relatively simple matter for the voltage across the output terminals 14, 15 to raise rapidly, even with a significant capacitive load. This is due to the fact that energy can be rapidly dumped into the load through the rectifier 52 in the direction of an increasing voltage in the sense of the poling of the rectifier 52. But now consider changing the input to the chopper from a full voltage to zero voltage. Although the voltage across the transformer can reduce substantially instantaneously, the load attached to the output terminals 14, 15 cannot discharge rapidly through the rectifier 52 because it is poled in the wrong direction. Therefore, the voltage across the capacitive load will decay only slowly through the back impedance of the rectifier 52 and the secondary 50, or through other impedances within the load. In other words, the converter of FIG. 4 is not reciprocal, and is highly nonlinear to time varying signals. However, the present invention overcomes this difficulty since, when the input voltage at the terminal 30 (FIG. 1) is rapidly changed from plus 30 to 0 volts, not only does the converter 10 stop generating the plus 6 KV output, but the converter 12 generates minus 6 KV and, since its terminal 17 is tied to the voltage reference 18, its terminal 16 immediately drives to 6 KV below the reference, so as to drive the load 20 down to 0 volts. This it can readily do because its rectifier (see FIG. 4) is poled in such a direction as to allow a heavy current flow from the terminal 16 through the converter to the terminal 17 so that there is a rapid exchange of energy from the load 20 through the converter 12 to the voltage reference 18. This naturally will cause the voltage reference 18 to attain a voltage slightly higher than 6 KV momentarily, but once the transient is completed, the resistor 36 will slowly bleed the capacitor 34 so that it will tend to resume the 6 KV charge. Once the voltage across the capacitor 34 is restored to 6 KV, there is no futher discharging since the potential is maintained by the converter 12. The resistor 36 should preferably be sufficiently large so that the power dissipation through it directly from the terminal 17 to ground is minimal in contrast with the power required to drive the load 20. On the other hand, employing the zener diode 38 in place of the resistor 36 (as illustrated in FIG. 3) can result in substantially no power dissipation except for normal real-circuit losses during the transient period immediately following the switching of the input voltage.

Because the converter 10 drives the load upwardly or in a positive direction very rapidly, and the converter 12 drives the load downwardly or in a negative direction very rapidly, the high voltage across the load 20 can change in either direction very rapidly. Thus it can be seen that if the converters 10, 12 in combination with their controlling transistors 28, 29 are each linear in the positive direction, the combination of them, being reciprocal, will be linear in either direction of change of the input signal.

The embodiment of FIGS. 1–4 has been described with respect to purely on/off operation. However, since the converters 10, 12 are simply unilateral linear systems having a gain of 200, it should be apparent that voltages between 0 and 30 volts will apply corresponding voltages (200 times greater) across the load 20. Thus if the input voltage is 10 volts, the load will have 2 KV impressed thereacross and the converter 12 will have 4 KV at its output; the total voltage remains at 6 KV. Therefore, the voltage at the input terminal 30 may be varied in any desired fashion, and the voltage across the load 20 will follow it, just as in the case of low voltage amplifiers.

Figure 5:
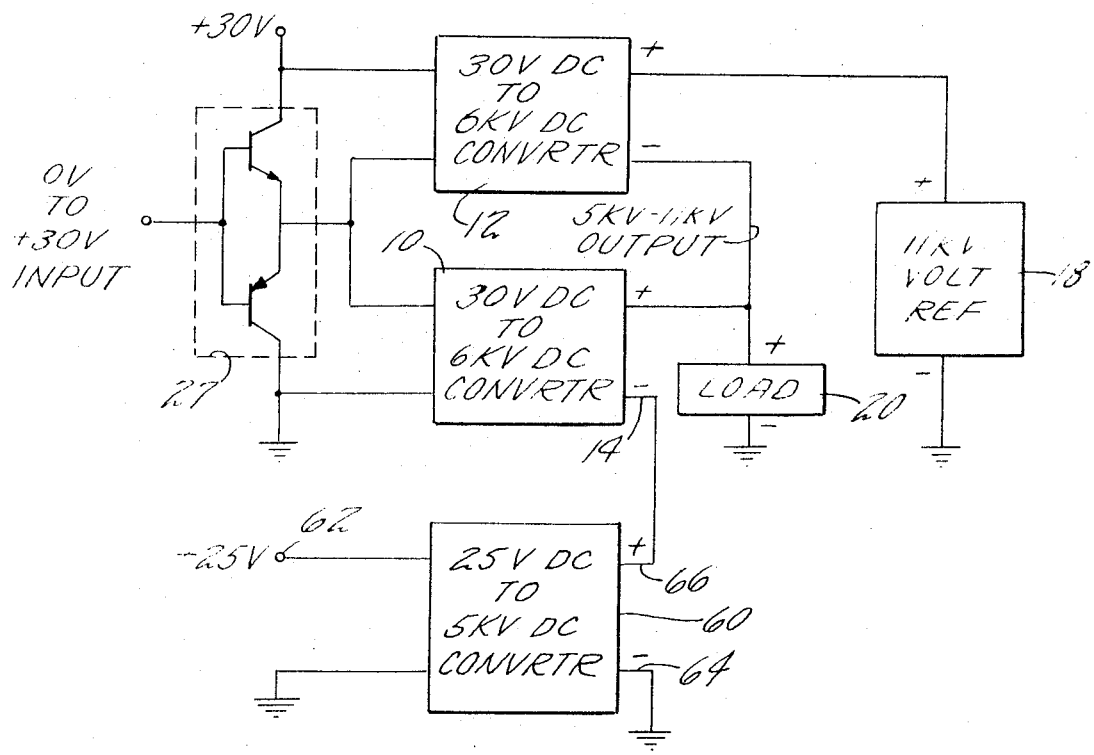
FIG. 5 is a schematic block diagram of an embodiment of the invention employing fixed bias.

The embodiment just described with respect to FIGS. 1–4 slews the load voltage from zero to the working voltage of the system (therein 6 KV). In the embodiment of FIG. 5, the voltage can be slewed between some low finite voltage to a higher working voltage. In FIG. 5, an additional voltage source 60 is connected between the low voltage output terminal 14 of the converter 10 and ground. The converter 60 is illustrated, for simplicity in the description herein, as being a device which constantly receives a 25 volt input from a source 62 and provides a constant 5 KV DC output across its output terminals 64, 66. Thus, when the output of the converter 10 is zero volts and the output of the converter 12 is 6 KV the load 20 will have 5 KV impressed across it. However when the converter 12 is at 0 volts and the converter 10 is at 6 KV, then the load 20 will have eleven KV applied across it. The voltage reference 18 can be the same as that described with respect to FIGS. 1–3 hereinbefore, it simply working at a higher voltage in this case.

The embodiment of FIG. 5 is well suited for utilization as a slewing high voltage anode supply for a multiple phosphor, variable penetration type cathode ray tube, as described hereinbefore. In such a case, the load 20 comprises the anode of the cathode ray tube (a very high capacitance, large surface area of conductive coating from the gun area at the neck of the tube all the way to the screen of the tube). At sub-video rates, whenever the color or persistence of the tube is to be changed, changing of the anode voltage will affect the penetration of the electron beam into one or both layers of phosphor (in a typical two layer tube) to give a desired effect.

The high voltage systems described hereinbefore with respect to FIGS. 1–5 are illustrated as being non-inverting systems. Of course, the polarities applied to the input circuit 27, as well as the polarity of the input signal source, can be adjusted to provide for inversion between the input and the output if desired.

Figure 6:
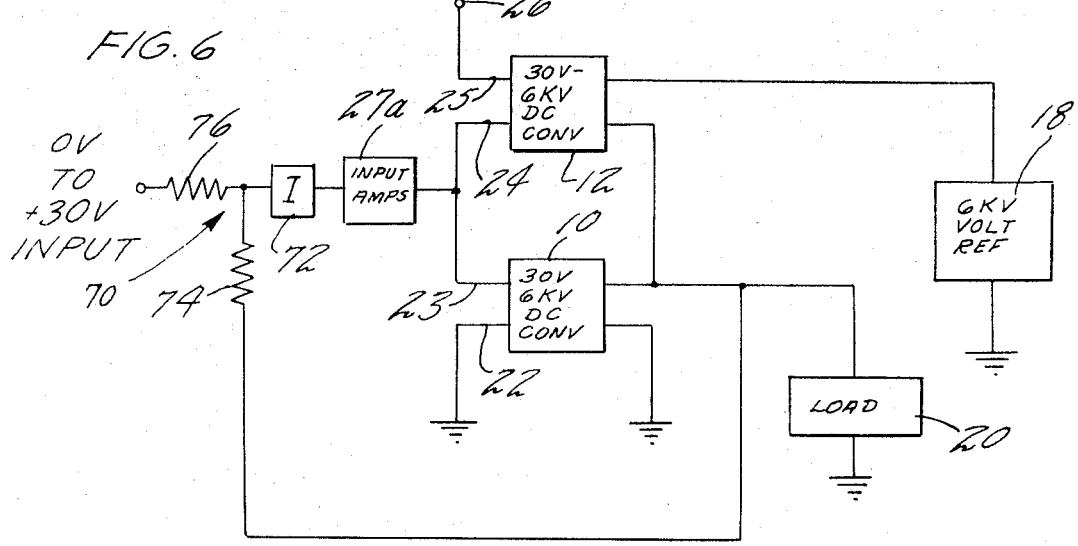
FIG. 6 is a schematic block diagram of an embodiment of the invention employing feedback.

Because of the fact that the high voltage system of the type described with respect to FIGS. 1–5 hereinbefore comprises a bilateral linear high voltage system, it can employ feedback which will be linear in both polarities. This is illustrated in FIG. 6 which is the same as the embodiment of FIG. 1 with the exception of the fact that a feedback loop 70 is provided to stabilize the operation of the system and provide very accurate control of the voltage across the load 20. The feedback loop 70 includes a pair of summing resistors 74, 76 which can be selected in accordance with well known teachings in the amplifier feedback art so as to provide operation as desired, and an inverter 72 (so that the feedback will be negative). The input circuit 27a is connected to invert the input in FIG. 6. Feedback control over a high voltage system is relatively unknown in the practical sense in the prior art because the high voltage systems available heretofore have been unable to provide a sufficiently rapid response in the inverse direction and therefore provide very nonlinear control over the output voltage. This is due to the fact (as described with respect to FIG. 4 hereinbefore) that although the feedback could increase the voltage rapidly across the load, it could not decrease it due to the inability of the rectifiers 52 to conduct current out of the load in a direction opposite to that in which the rectifier 51 is poled. However, with the present invention, since the load is driven in each direction as described hereinbefore, effective linear feedback can be provided just as in the case of low voltage amplifiers.

The converters 10, 12, 60 may be any converters known to the art, or equivalent high voltage supplies. For instance, an AC input could be utilized and the chopper 46 (FIG. 4) could be eliminated if desired. In such a case, the converters 10, 12, 60 would necessarily be AC to high voltage DC converters. In any event, that portion of the converters 10, 12, 60 equivalent to the structure 48–52 in FIG. 4 may preferably comprise the rectifying transformer of the type known in the art.

This device has a minimal leakage inductance and has mitigated the effects of interwinding capacitance so that it has a rather high frequency response for a high voltage DC device. However, systems in accordance with the present invention are nonetheless limited, with components available in today's technology, to frequency responses on the order of several KHz.

The voltage sources 10, 60 in the embodiment of FIG. 5 are separate voltage sources. Of course, it should be understood that a single voltage source could be utilized instead of these two sources, in which case it would be provided with an ability to respond to input signals so as to slew from 5 KV to 11 KV as do the two sources together. This is immaterial to the present invention. Also, the load 20 could be connected across the source 12 rather than across the source 10 or the series combination of the sources 10, 60. This could, however, provide some problems in the return paths to the load including the power sources 10 (and possibly 60). In any event, the gist of the invention is that the voltage reference 18 provides a reference so that the load can be driven downwardly as well as driven upwardly in changing from one voltage to another, in combination with high voltage sources which are capable of driving a load in opposite directions (source 10 being positive and source 12 being negative). Similarly, other suitable voltage references may be used in place of the voltage reference 18 to suit any implementation of the present invention.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. A bilateral high voltage system comprising:
   a plurality of high voltage DC sources, at least first and second ones of said sources for providing a variable high DC output voltage across a pair of output terminals of mutually opposite polarity, in correspondence with a variable input signal thereto, said first and second sources capable of providing the same range of output voltage, the outputs of all of said sources being connected in series with one another, an output terminal of a first polarity of each source being connected to an output terminal of an opposite polarity of a source adjacent thereto in said series;
   a load connected across a series combination of all of said sources except said first source;
   means connected across a series combination of all of said sources for maintaining a substantially constant high DC voltage equal to the maximum voltage which can be impressed across said load by the sources across which said load is connected; and
   input means for differentially applying inputs to said first and second sources so that the voltage output of said first source is complementary to the voltage output of said second source, and vice versa, within said range of output voltage.

2. The bilateral high voltage system according to claim 1 additionally comprising feedback means connected to said input means from said load for stabilizing the operation of said system.

3. The bilateral high voltage amplifier according to claim 1 wherein said high voltage DC sources comprise DC to DC converters.

4. The bilateral high voltage system according to claim 1 wherein said input means comprises a pair of complementary transistors connected in series with each other, each connected across the input of a respective one of said sources, the base of each of said transistors connected to a common input terminal.

5. The bilateral high voltage system according to claim 1 wherein said constant voltage maintaining means comprises a capacitor which is large with respect to the capacitance of said load, shunted by a resistor.

6. The bilateral high voltage system according to claim 1 wherein said constant voltage maintaining means comprises a high voltage zener diode shunted by a capacitor.

* * * * *